(12) United States Patent
Tokunaga

(10) Patent No.: US 6,401,750 B2
(45) Date of Patent: Jun. 11, 2002

(54) FUEL TANK UNIT OF MOTORCYCLE

(75) Inventor: Katsuhiko Tokunaga, Hamakita (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/796,428

(22) Filed: Mar. 2, 2001

(30) Foreign Application Priority Data

Mar. 2, 2000 (JP) ..................................... 2000-057686

(51) Int. Cl.$^7$ .............................. B60P 3/22; F02M 37/04
(52) U.S. Cl. .................. 137/565.34; 280/835; 123/509; 123/514; 137/574
(58) Field of Search ................ 137/565.17, 565.34, 137/574; 280/835, 834; 123/509, 514

(56) References Cited

U.S. PATENT DOCUMENTS

| | | | |
|---|---|---|---|
| 4,354,469 A | * 10/1982 | Sato | 123/460 |
| 4,653,762 A | * 3/1987 | Nakamura et al. | 280/835 |
| 4,871,041 A | * 10/1989 | Saito et al. | 180/219 |
| 5,988,213 A | * 11/1999 | Yoshioka | 137/590 |
| 6,065,452 A | * 5/2000 | Yoshioka | 137/585 |
| 6,253,790 B1 | * 7/2001 | Hara | 137/565.17 |

FOREIGN PATENT DOCUMENTS

JP  2-28075  * 1/1990  ................ 280/834

* cited by examiner

Primary Examiner—A. Michael Chambers
(74) Attorney, Agent, or Firm—Oblon, Spivak, McClelland, Maier & Neustadt, P.C.

(57) ABSTRACT

A fuel tank unit of a motorcycle comprises a tank body having a bottom portion to which a through hole is formed in a standing state of the motorcycle, a fuel pump mounted to the bottom portion of the tank body, a pump case having a bottomed bawl-shape mounted to be liquid-tightly to the through hole formed to the tank body so as to communicate an inner space of the pump case with an inner space of the tank body through the through hole, and a suction unit for the fuel pump disposed in the pump case at a height level between the bottom portion of the tank body and a bottom surface of the pump case. A pump mount bracket is further mounted to the bottom portion of the tank body to be liquid-tightly and formed with a pump mount hole to which the fuel pump is mounted.

5 Claims, 4 Drawing Sheets

FUEL TANK UNIT OF MOTORCYCLE

BACKGROUND OF THE INVENTION

The present invention relates to a fuel tank unit or device of a motorcycle having a structure in which a fuel pump is arranged in an interior of a fuel tank body.

Recently, it is required for, so-called, a two-wheeled motorcycle to discharge an exhaust gas containing low harmful component for environment and to be operated with improved fuel economy, and in accordance with such requirement, there has been developed a fuel supply system utilizing a fuel injection unit. In such motorcycle, it is necessary to feed, under pressure, the fuel in the fuel tank into the fuel injection unit disposed on the engine side, and therefore, a fuel pump is mounted to the fuel tank.

FIG. 4 shows a conventional fuel tank unit of the type mentioned above.

With reference to FIG. 4, the fuel tank unit includes a tank body 101 having an inner bottom surface 101a, and a fuel pump 102 is mounted in the vicinity of the lowest portion of the inner bottom surface 101a. The fuel pump 102 is provided with a suction unit or member (fuel intake port) 103 is located to a position slightly higher than the bottom surface 101a in an installed (viewed) state. When the fuel pump 102 is driven, the fuel in the tank body 101 is sucked through the suction unit 103 so as to provide a predetermined pressure and the pressurized fuel is fed to the fuel injection unit 105 through a fuel hose 104.

However, according to the structure of the conventional fuel tank unit mentioned above, since the fuel intake port (suction unit) 103 is disposed to the position higher than the bottom surface 101a of the tank body 101, for example, at a time when the motorcycle is rapidly reduced in running speed in a case of less remaining fuel in the fuel tank body 101, the fuel in the tank body 101 moves forward therein and the fuel suction unit 103 is exposed above the surface of the fuel in the tank body 101. In such case, the fuel pump 102 sucks air and, hence, there causes a temporary fuel running-out, thus being inconvenient.

SUMMARY OF THE INVENTION

An object of the present invention is to substantially eliminate inconvenience encountered in the prior art mentioned above and to provide a fuel tank unit of a motorcycle capable of preventing a temporary fuel running-out at the time when a less amount of fuel remains in the tank and improving a sealing performance between the tank body and the fuel pump with reduced parts and members associated with the fuel pump.

This and other objects can be achieved according to the present invention by providing a fuel tank unit of a motorcycle comprising:

a tank body having a bottom portion to which a through hole is formed in a standing state of the motorcycle;

a fuel pump mounted to the bottom portion of the tank body;

a pump case having a bottomed bawl-shape mounted to the fuel pump to be liquid-tightly to the through hole formed to the tank body so as to communicate an inner space of the pump case with an inner space of the tank body through the through hole; and a suction unit for the fuel pump disposed in the pump case at a height level between the bottom portion of the tank body and a bottom surface of the pump case.

At a time when the remaining fuel amount is small, even if the motorcycle is rapidly reduced in speed and the fuel in the tank body is one-sided to its forward position, the liquid surface of the fuel remaining in the pump case is kept above the location level of the suction unit, thus preventing a temporary fuel running-out from occurring.

In a preferred example of the present invention, a cylindrical member is disposed to the bottom portion of the tank body so as to extend upward to surround an outer periphery of the through hole.

Furthermore, the fuel tank unit of the present invention may further comprises a pump mount bracket mounted to the bottom portion of the tank body to be liquid-tightly and formed with a pump mount hole to which the fuel pump is mounted and the pump case is mounted to the pump mount hole so that a lower surface portion of the pump mount bracket and an upper surface portion of the pump case are mated with each other liquid-tightly and then fastened together. In this example, the cylindrical member is disposed to the pump mount bracket so as to extend upward to surround an outer periphery of the pump mount hole. The cylindrical member is formed integrally with the pump mount bracket.

According to such preferred example, the location of the cylindrical surrounding member makes further high the surface level of the fuel remaining in the fuel pump with respect to the suction unit at the time when the fuel is moved in the tank body to be one-sided to the forward position therein to thereby further surely prevent the fuel running out from occurring.

The location of the pump mount bracket makes it possible to improve the assembling performance and sealing performance between the tank body and the fuel pump. The number of members or parts can be reduced by integrally forming the cylindrical member to this pump mount bracket.

The nature and further characteristic features of the present invention can be made more clear from the following descriptions made with reference to the accompanying drawings.

DESCRIPTION OF THE PREFERRED EMBODIMENT

A preferred embodiment of a fuel tank unit of a motorcycle according to the present invention will be described hereunder with reference to the accompanying drawings.

Figure 1:
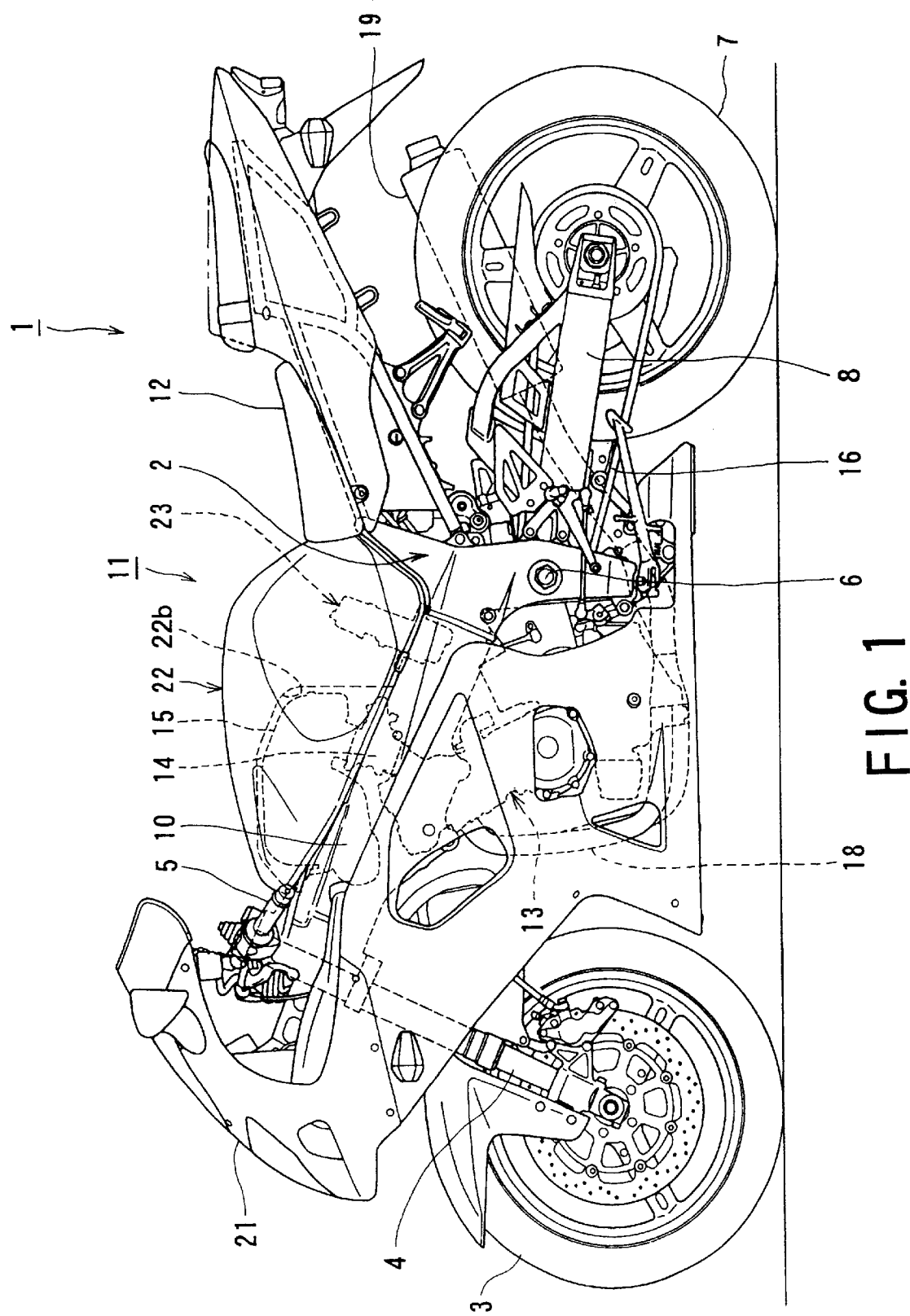
FIG. 1 is a left side view of a motorcycle to which a fuel tank unit according to the present invention is applied.

With reference to FIG. 1, a motorcycle 1 has a motorcycle body frame 2 having a front end portion to which a front fork 4 supporting a front wheel 3 is supported to be rotatable together with a handle bar 5. A swing arm 8 supporting a rear wheel 7 is supported to be vertically swingable by a pivot shaft 6 mounted in a width direction of the motorcycle at a central lower portion of the body frame 2.

A front half portion of the body frame 2 is composed of a lateral pair of thick main pipes 10. A fuel tank unit 11 is located above the main pipes 10, and a seat member 12 is disposed at a rear side of the fuel tank unit 11. For example, an in-line four-cylinder four-stroke-cycle DOHC (double-over-head-cam) type water-cooled engine 13 is mounted below the fuel tank unit 11, and a transverse four series fuel injection unit 14 are connected to an upper portion of the engine 13. An air cleaner 15 having a box shape is also connected to the upper portion of the fuel injection unit 14. The output of the engine 13 is transmitted to the rear wheel 7 by means of chain 16.

An exhaust tube extending from the front surface of the engine 13 further extends round the lower surface of the engine 13 and then extends rearward therefrom so as to be connected to an exhaust muffler 19. The front half portion of the motorcycle body is covered by a cowling having a streamline shape, and the engine 13, fuel injection unit 14, air cleaner 15, exhaust pipe 18, etc. are concealed from the external portion.

Figure 2:
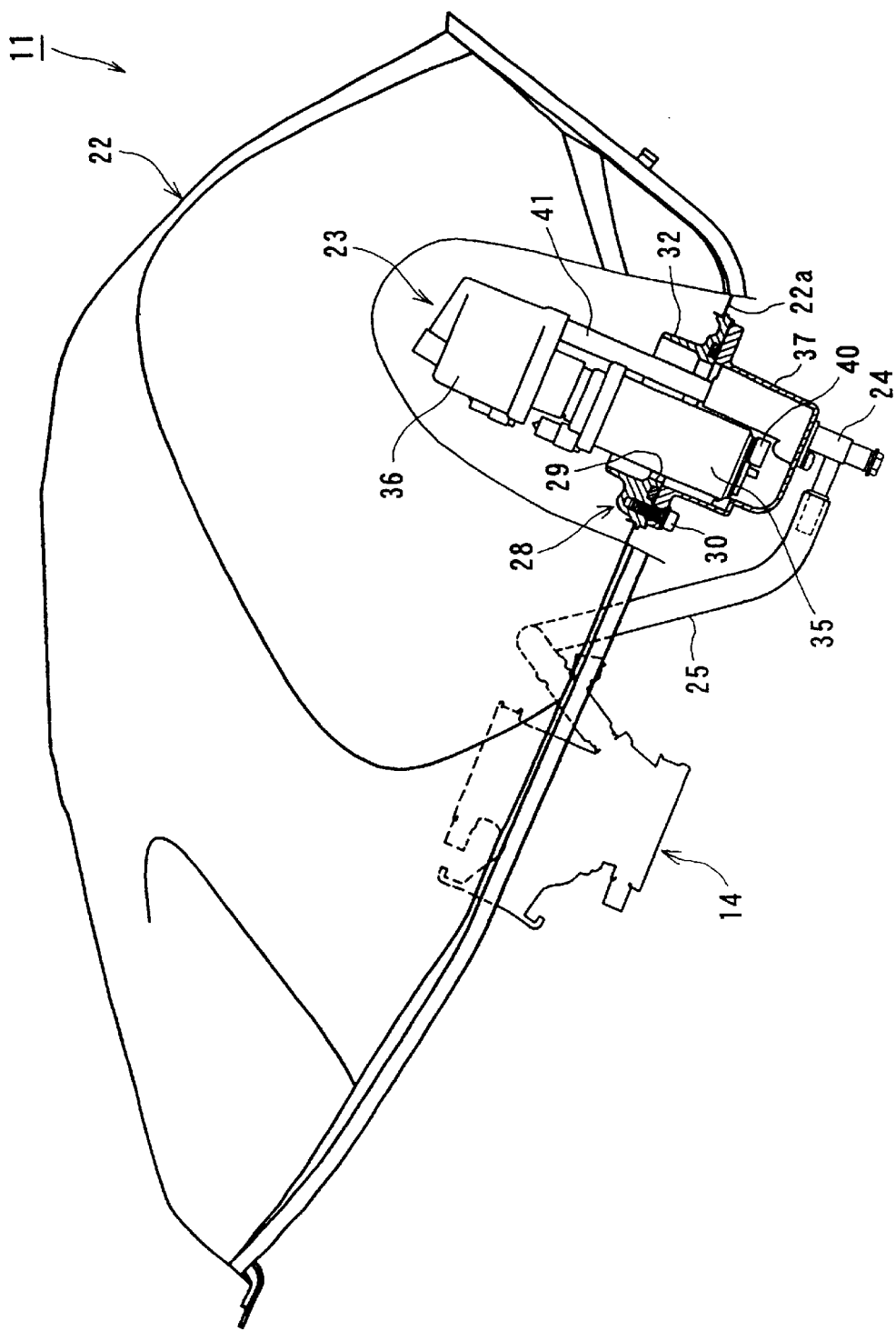
FIG. 2 is a left side view, in an enlarged scale, of a fuel tank unit of the motorcycle of FIG. 1.

As shown in FIG. 2, the fuel tank unit 11 has a structure in which a fuel pump 23 is disposed at a rear portion of the bottom surface 22a of a tank body 22. A recess 22b, recessed upward as shown in FIG. 1, is formed to a front lower surface of the tank body 22 and an air cleaner 15 is housed in this recess 22b. The lower portion (which constitutes a pump case 37 as mentioned hereinlater) of the fuel pump 23 projects (is exposed) downward at the rear portion of the bottom surface 22a of the tank body 22, and a union 24 formed to this lower portion and the fuel injection unit 14 are communicated through a fuel hose 25.

Figure 3:
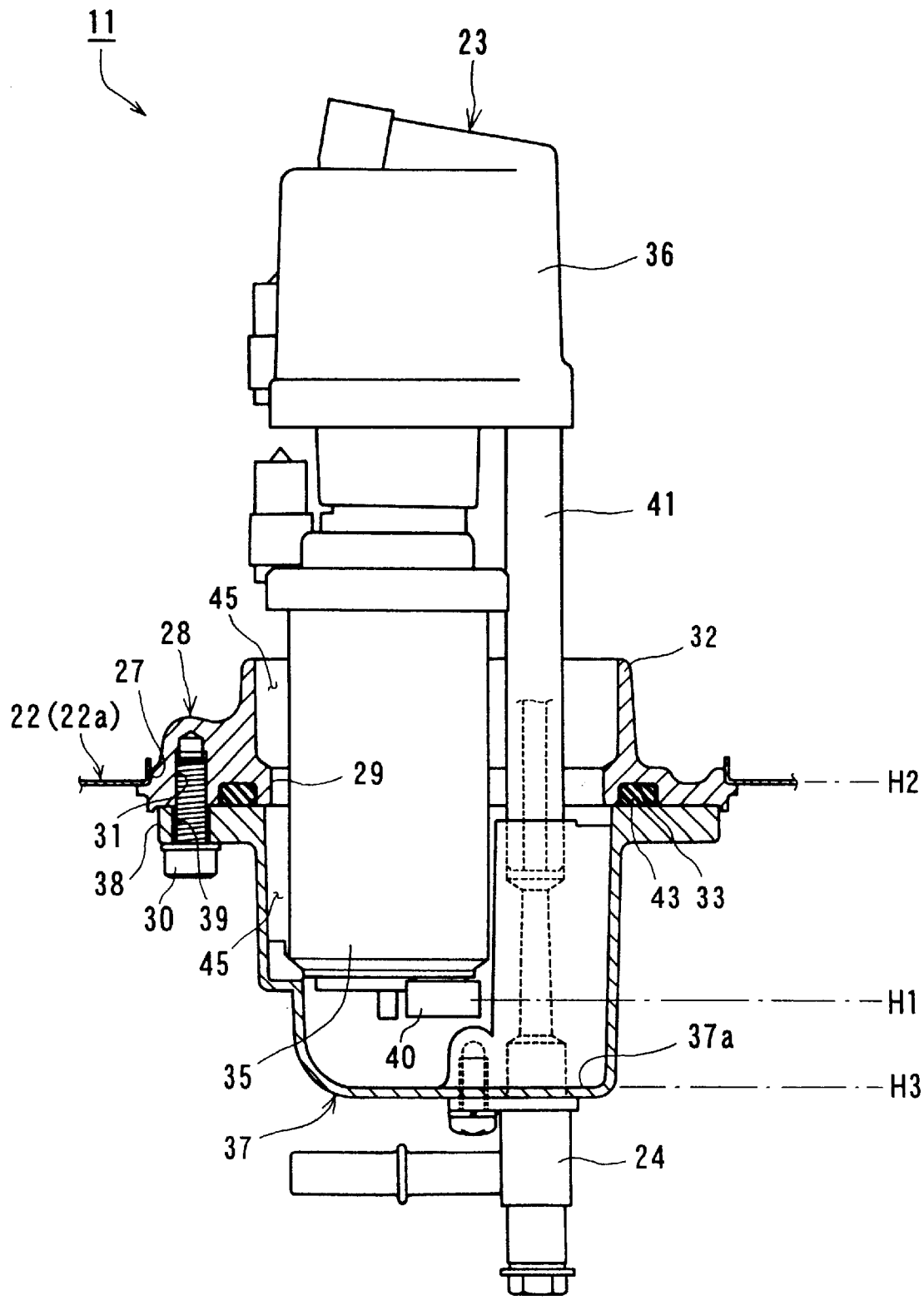
FIG. 3 is an enlarged elevational view, partially in section, showing an arrangement of a fuel tank bottom portion, a fuel pump mounting bracket and a fuel pump.
Figure 4:
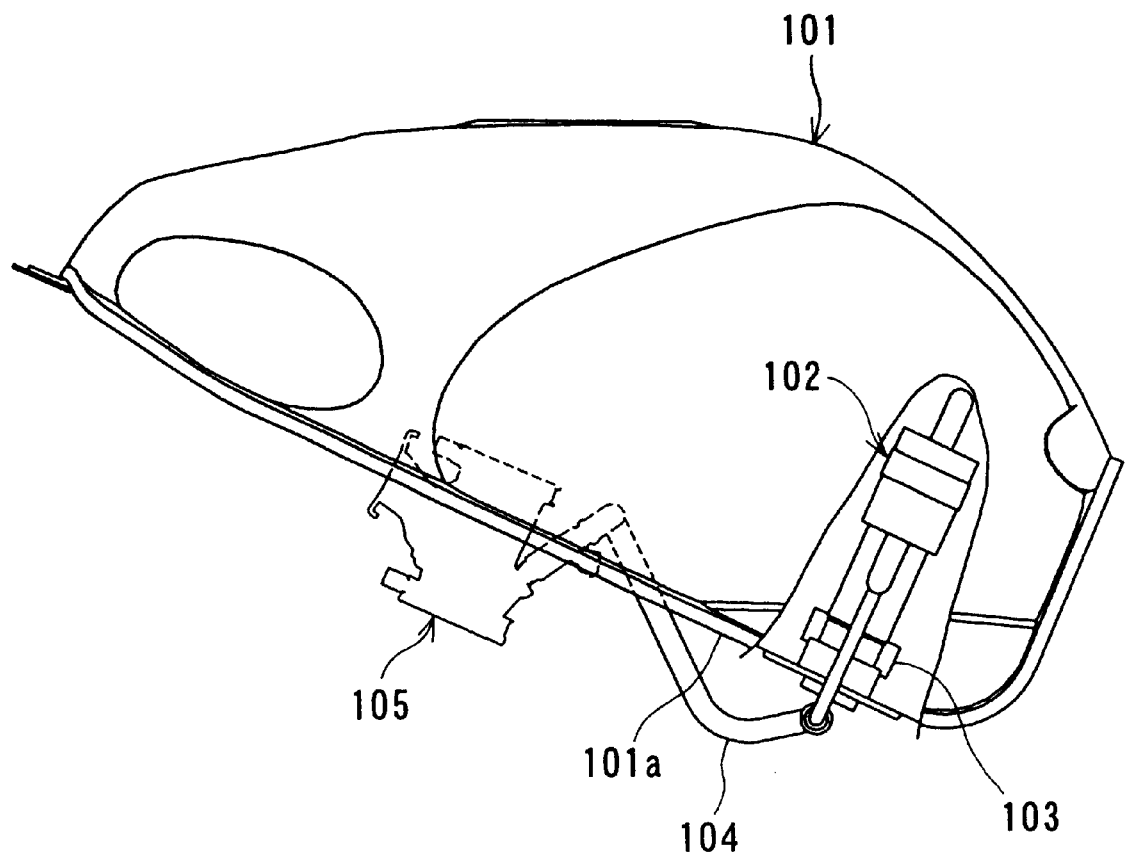
FIG. 4 is a left side view, in an enlarged scale, of a fuel tank unit of a conventional structure.

With reference to FIG. 3 in an enlarged scale, a circular through hole 27 is formed to the rear portion of the bottom surface 22a of the tank body 22, and a pump mount bracket 28, as an independent member, is fitted into this hole 27 from the lower portion thereof and fixed to the bottom surface 22a by means of welding, for example. The fuel pump 23 is fitted and then secured by means of screws 30 to a circular pump mount hole 29 formed to this pump mount bracket 28.

The pump mount bracket 28 has substantially an annular shape in a plan view and has the pump mount hole 29 at the central portion thereof and a plurality of screw holes 31 are formed to the peripheral portion of the hole 29 from the lower side thereof. In one example, five screw holes 31 may be formed. Furthermore, a short cylindrical member 32 is integrally formed to the upper surface portion of the pump mount bracket 28 so as to extend upward therefrom to surround the outer periphery of the pump mount hole 29, and an annular groove 33 as seal means is formed to the lower surface side of the pump mount bracket 28 in the vicinity of the outer periphery of the pump mount hole 29.

The fuel pump 23 has a pump body 35 on which a filter unit 36 is mounted and a pump case 37 formed to the lower portion of the pump body 35. The pump case 37 serves as a mount bracket for entirely mounting fuel pump 23 to the tank body 22, i.e. pump mount bracket 28. The pump case 37 has a bottomed bawl-shape as shown in FIG. 3 and is formed, at its upper portion, with a flat flanged portion 38, to which a plurality of screw holes 39 aligned with the screw holes 31 formed to the pump mount bracket 28 are formed.

A suction unit 40 located to the lower portion of the pump body 35 is housed in the pump case 37 as an intake port member and has a height H1, which is set to be a value between a height H2 of the bottom surface 22a of the tank body 22 and a height H3 of a bottom surface 37a of the pump case 37, the height H1 being slightly near the height H3 rather than the height H2 in a preferred example. Further, a drain tube 41 extending downward from the filter section 36 is connected to the union 24 formed to the pump case 37 as mentioned before.

A seal ring 43 formed of such as rubber having anti-fuel property is fitted to the seal groove 33 of the pump mount bracket 28 to ensure the liquid tight state between the pump mount bracket 28 and the pump case 37. A mount flange 38 of the pump case 37 is mated with the lower surface of the pump mount bracket 28 and fastened together by means of screw members 30 inserted into the screw holes 39 formed to the mount flange 38. According to this structure, the upper surface of the pump case 37, i.e. mount flange 38, is secured to the lower surface of the pump mount bracket 28 to thereby entirely fix the fuel pump 23 to the tank body 22.

As mentioned above, according to the structure of the preferred embodiment of the present invention, the independently formed pump mount bracket 28 is secured to the bottom surface 22a of the tank body 22 through the through hole 27 formed thereto and the pump case 37 is fastened to the lower surface of the pump mount bracket 28 by means of a plurality of screw members 30. Therefore, the assembling performance and the sealing performance between the tank body 22 and the fuel pump 23 can be remarkably improved in comparison with the structure in which the pump case 37 of the fuel pump 23 is directly fastened to the bottom surface 22a of the tank body 22, thus enhancing the reliability in operation.

Furthermore, according to the arrangement of the present embodiment, there is defined the space 45 between the pump body 35 of the fuel pump 23 and the inside surface of the pump case 37, the pump mount hole 29 of the pump mount bracket 28 and the cylindrical surrounding member 32. Through this space 45, the inner space of the pump case 37 is communicated with the inner space of the tank body 22 by way of the pump mount hole 29, and the fuel supplied into the tank body 22 is fed to the inside of the pump case 37 through the pump mount hole 29.

With the fuel tank unit 11 of the structure mentioned above, when the fuel pump 23 is operated, the fuel flowing into the pump case 37 from the tank body 22 through the pump mount hole 29 is sucked into the suction section 40, and the sucked fuel is pressurized to a predetermined pressure by the pump body 35, then filtered by the filtering section 36, and thereafter, supplied to the fuel injection unit 14 from the drain tube 41 through the union 24 and the fuel hose 25.

For example, in an occasion where the fuel remaining in the tank body 22 is reduced, when the motorcycle 1 is rapidly decreased in the traveling speed, the fuel remaining in the tank body 22 is one-sided, i.e. moved to its forward position. However, the fuel filling in the pump case 37 is not moved forward and remains therein because the fuel is positioned below the bottom surface 22a of the fuel tank body 22, and hence, the fuel level in the pump case 37 is kept above the suction unit 40 of the fuel pump 23, thus preventing the temporary fuel running-out from occurring.

As mentioned hereinbefore, the amount of the fuel remaining in the pump case 37 can be largely increased by the location of the cylindrical surrounding member 32 surrounding the periphery of the pump mount hole 29, and the level of the remaining fuel becomes high with respect to the suction section 40 of the fuel pump 23. Therefore, even in a case where rapid speed increasing and decreasing operation are repeated, the temporary fuel running-out can be surely prevented. Furthermore, the cylindrical surrounding member 32 is integrally formed to the pump mount bracket 28, it is not necessary to independently provide the surrounding member, thus saving the number of parts and making simple the assembling working.

It is to be noted that the present invention is not limited to the described embodiment and many other changes and modifications may be made without departing from the scopes of the appended claims.

What is claimed is:

1. A fuel tank unit of a motorcycle comprising:
   a tank body having a bottom portion to which a through hole is formed in a standing state of the motorcycle;
   a fuel pump mounted to the bottom portion of the tank body;
   a pump case having a bottomed bawl-shape mounted to be liquid-tightly to the through hole formed to the tank body so as to communicate an inner space of the pump case with an inner space of the tank body through the through hole;
   a suction unit for the fuel pump disposed in the pump case at a height level between the bottom portion of the tank body and a bottom surface of the pump case; and
   a cylindrical member disposed to the bottom portion of the tank body so as to extend upward to surround an outer periphery of the through hole.

2. A fuel tank unit of a motorcycle according to claim 1, further comprising a pump mount bracket mounted to the bottom portion of the tank body to be liquid-tightly and formed with a pump mount hole to which said fuel pump is mounted and said pump case is mounted to the pump mount hole so that a lower surface portion of the pump mount bracket and an upper surface portion of the pump case are mated with each other liquid-tightly and then fastened together.

3. A fuel tank unit of a motorcycle according to claim 2, wherein the cylindrical member is disposed to the pump mount bracket so as to extend upward to surround an outer periphery of the pump mount hole.

4. A fuel tank unit of a motorcycle according to claim 3, wherein said cylindrical member is formed integrally with the pump mount bracket.

5. A fuel tank unit of a motorcycle according to claim 1, wherein the bottom portion of the tank body is formed so as to incline forward upward with respect to a horizontal plane and the bottomed bawl-shaped pump case and the fuel pump are mounted to the inclining surface portion of the tank bottom portion to be substantially perpendicularly to the inclining surface portion.

* * * * *